(12) United States Patent
Riedel et al.

(10) Patent No.: US 7,436,173 B2
(45) Date of Patent: Oct. 14, 2008

(54) MEASUREMENT CONFIGURATION

(75) Inventors: Stefan Riedel, Überlingen (DE); Axel Sautter, Überlingen (DE); Jürgen Späh, Überlingen (DE)

(73) Assignee: Diehl Avionik Systeme GmbH, Uberlingen/BRD (DE)

( * ) Notice: Subject to any disclaimer, the term of this patent is extended or adjusted under 35 U.S.C. 154(b) by 69 days.

(21) Appl. No.: 11/494,376

(22) Filed: Jul. 27, 2006

(65) Prior Publication Data
US 2007/0024274 A1 Feb. 1, 2007

Related U.S. Application Data

(60) Provisional application No. 60/710,253, filed on Aug. 22, 2005.

(30) Foreign Application Priority Data
Jul. 28, 2005 (DE) .................... 10 2005 035 316

(51) Int. Cl.
*G01B 7/14* (2006.01)
*H01F 5/00* (2006.01)
(52) U.S. Cl. .................................. 324/207.18
(58) Field of Classification Search .................
324/207.15–207.18, 207.24, 207.25; 318/657; 340/870.36
See application file for complete search history.

(56) References Cited

U.S. PATENT DOCUMENTS

| 4,628,499 | A | * | 12/1986 | Hammett | ..................... 700/56 |
| 4,651,130 | A | * | 3/1987 | Pennell | ..................... 341/116 |
| 4,896,110 | A | | 1/1990 | Shimizu et al. | |
| 4,982,156 | A | * | 1/1991 | Lewis et al. | ............. 324/207.18 |
| 5,801,645 | A | | 9/1998 | Erickson et al. | |
| 2004/0027118 | A1 | * | 2/2004 | Lenz et al. | ............. 324/207.26 |
| 2005/0046593 | A1 | * | 3/2005 | Tulpule et al. | ......... 340/870.36 |

FOREIGN PATENT DOCUMENTS

DE 38 25 975 A1 2/1989
FR 2 795 534 12/2000

* cited by examiner

*Primary Examiner*—Kenneth J Whittington
(74) *Attorney, Agent, or Firm*—Laurence A. Greenberg; Werner H. Stemer; Ralph E. Locher

(57) ABSTRACT

A movement distance sensor operates as a differential transformer with a primary coil, at least two secondary coils. A circuit configuration is connected to the secondary coils in order to determine a movement distance. The circuit configuration includes a multiplexer, an A/D converter, and a digital logic module. The multiplexer is connected to the first and the second secondary coil via an input stage. The output of the multiplexer is connected to the input of the A/D converter and the output of the A/D converter is passed to the input of the digital logic module. The latter determines the movement distance from the input signals received alternately from the multiplexer. The measurement configuration exhibits high reliability with low error tolerances.

7 Claims, 3 Drawing Sheets

MEASUREMENT CONFIGURATION

CROSS-REFERENCE TO RELATED APPLICATIONS

This application claims the priority, under 35 U.S.C. § 119(e), of provisional patent application No. 60/710,253 filed Aug. 22, 2005; the application further claims the priority, under 35 U.S.C. § 119(a), of German patent application No. 10 2005 035 316.9, filed Jul. 28, 2005; the prior applications are herewith incorporated by reference in their entirety.

BACKGROUND OF THE INVENTION

Field of the Invention

The invention relates to a measurement configuration having a movement distance sensor which operates on the principle of a differential transformer and has a primary coil as well as a first and a second secondary coil, and having a circuit configuration whose circuitry is connected to the first and second secondary coils in order to determine a movement distance.

A movement distance sensor operating on the principle of a differential transformer, also referred to as a VDT (variable differential transformer), is suitable for direct measurement of linear movements with high resolution in the range between a few thousandths of a millimeter and more than one meter. Owing to the high accuracy and the robustness, movement distance sensors such as these are used in particular for mechanical position determination in the field of aviation. By way of example, exact position determination is essential for control of the landing flaps or control surfaces. However, movement distance sensors such as these are also worth using for determination of the position of doors, in particular for an automatic door control system.

A movement distance sensor operating on the principle of a differential transformer comprises a primary coil as well as two secondary coils which are wound on an appropriately designed cylindrical body with a central hole. In this case, the primary coil is wound centrally on the cylindrical body, and the two secondary coils are wound in front of and behind the primary coil, so that this results in a secondary coil/primary coil/secondary coil sequence along the cylindrical body. A core composed of ferromagnetic material can move freely in the central hole, and can be connected to the object to be measured via a connecting element.

The length extent of the ferromagnetic core is defined such that its position within the central hole influences the magnitude of the magnetic flux between the primary and secondary coils. When the core is moved from its rest position in the center of the cylindrical body, that is to say at the same level as the primary coil, in the direction of one of the secondary coils, then this increases the magnetic flux between the primary coil and that secondary coil in whose direction the core has moved. In a corresponding manner, the magnetic flux is reduced for that secondary coil from which the core has moved away. If a sinusoidal excitation voltage is fed to the primary winding, an alternating voltage is induced in the secondary coils, whose magnitude is dependent on the axial movement of the core. The two secondary voltages induced in the secondary coils form the output signal of the described movement distance sensor, and are evaluated in order to determine the position of the core which can move in the central hole.

Normally, the output signals from a VDT sensor, that is to say the voltages induced in the secondary coils, are processed by means of analog circuits or by means of analog modules in order to determine the distance of movement. Since the position of the movement distance sensor, that is to say the change in position of the ferromagnetic core with respect to its rest position, can be calculated from the difference between the absolute values of the two secondary voltages, it is known, for example, for the output signals from a VDT sensor to be applied to a rectifier. Analog modules are also normally used to form the difference between the two rectified secondary voltages. A measurement configuration with evaluation circuits such as these for a VDT sensor disadvantageously has inadequate reliability and error tolerances which can be improved, for applications in aviation.

SUMMARY OF INVENTION

It is accordingly an object of the invention to provide a measurement configuration, which overcomes the above-mentioned disadvantages of the heretofore-known devices and methods of this general type and which has a high degree of reliability and small error tolerances in the determination of the movement distance.

With the foregoing and other objects in view there is provided, in accordance with the invention, a method of measuring a movement distance. The novel method comprises the following steps:

providing a measurement configuration with a variable differential transformer assembly having a primary coil, first and second secondary coils, and an actuating element movably disposed for influencing a voltage induced into the secondary coils;

connecting the primary coil to an alternating voltage;

measuring a first input voltage at the first secondary coil and a second input voltage at the second secondary coil by scanning the first and second input voltages multiple times during a period of the alternating voltage;

passing the multiple-scanned first and second input voltages to a digital logic module;

determining a rectified average value of the first input voltage and of the second input voltage in the digital logic module; and calculating a relative position of the actuating element from the average values of the first and second input voltages.

In accordance with an added feature of the invention, the method comprises sequentially scanning each of the first and second input voltages and passing the first and second input voltages through a multiplexer and an analog-to-digital converter to the digital logic module. Preferably, the movement distance of the actuating element is determined in the digital logic module from the input signals received alternately from the multiplexer.

In a preferred mode of the method, the calculating step comprises calculating:

$$Q = \frac{V_1 - V_2}{V_{1,rms} + V_{2,rms}}$$

where Q is a normalized movement distance, $V_1$ and $V_2$ are the absolute magnitudes of the first and second input voltages induced in the first and second secondary coils, respectively, and $V_{1,rms}$ and $V_{2,rms}$ represent root mean square values of the first and second input voltages.

In accordance with an additional feature of the invention, the digital logic module provides offset correction for the input signals received alternately from the multiplexer.

With the above and other objects in view there is also provided, in accordance with the invention, a measurement configuration, comprising:

a variable differential transformer assembly including a primary coil, a first secondary coil and a second secondary coil, an actuating element movably disposed for influencing a voltage induced in the secondary coils, and a circuit configuration connected to the secondary coils for measuring a displacement of the actuating element;

the circuit configuration including a multiplexer connected to receive and to sequentially output a signal representing the voltages induced in the first and second secondary coils, an A/D converter for outputting a digital signal, and a digital logic module connected to receive and to process the digital signal;

the digital logic module being configured to calculate from the digital signals an amount of displacement of the actuating element.

In other words, the measurement configuration has a movement distance sensor which operates on the principle of a differential transformer and has a primary coil as well as a first and a second secondary coil, and has a circuit configuration whose circuitry is connected to the first and second secondary coils in order to determine a movement distance. The objects of the invention are achieved in that the circuit configuration comprises a multiplexer, an A/D converter and a digital logic module, the multiplexer in each case being connected to the first and the second secondary coil via an input stage, with the circuitry of the output of the multiplexer being connected to the input of the A/D converter, and with the output of the A/D converter being passed to the input of the digital logic module which is designed to determine the movement distance from the input signals received alternately from the multiplexer.

A first step of the invention is in this case based on the idea that the reliability of a circuit configuration and hence of a measurement configuration as such can be improved by reducing the number of modules required. In a circuit configuration for a VDT sensor, this can be achieved by passing the output voltages from the two secondary coils to a common measurement channel as early as possible. This is done by in each case connecting the first and second secondary coils to a multiplexer via an input stage. Since the multiplexer switches backward and forward alternately between the induced voltages from the first and second secondary coils, modules in a simple form can be used for measurement of both voltages in the circuit configuration following the multiplexer. The use of separate input stages is necessary for level matching. Reducing the number of modules improves the overall reliability.

In a further step, the invention is based on the idea that the use of a digital logic module for determination of the movement distance makes it possible to avoid the use of software. This reliably avoids any software-dependent errors. The logic operations to be carried out in a digital logic module are predetermined such that they are fixed. By way of example, a CPLD (Complex Programmable Logic Device), an FPGA (Field Programmable Gate Array) or an ASIC (Application Specific Integrated Circuit) is suitable for a logic module such as this. Apart from this, when using a digital logic module, there is no need for a digital computer, which in turn conceals a certain risk of failure.

Finally, in a third step, the invention identifies the fact that the measurement accuracy of the circuit configuration can be improved by using identical modules to carry out as many of the logic operations that are required for determination of the movement distance as possible. In the present case, this is achieved by passing the two induced voltages from the secondary coils to a common measurement channel as early as possible. Since, in terms of circuitry, the output of the multiplexer is connected to the input of the A/D converter, this also results in an increase in the measurement accuracy, since all the logic operations are carried out digitally. This is because this avoids any offset, which is naturally caused by analog modules, in the further voltage signals derived from the two induced voltages. Since the movement distance is determined by subtraction, any offset such as this reduces the measurement accuracy.

In order to determine the movement distance, the multiplexer passes the voltages induced in the first and second secondary coils alternately to the input of the A/D converter. In a corresponding manner, the digitized voltage signal from the first secondary coil and the digitized voltage signal from the second secondary coil are passed alternately to the input of the digital logic module. The movement distance can be deduced by forming the difference between the absolute values of the two voltages. Since the sum of the root mean square values of the voltages from the two secondary coils is constant irrespective of the position of the ferromagnetic core, it is normal to emit, as the output value for determination of the movement distance, the difference, normalized with respect to this sum, between the absolute values of the two induced voltages.

The digital logic module is advantageously designed to sample the input signals which are received alternately from the multiplexer. In this case, the measurement accuracy can be increased by increasing the sampling rate. The use of sampling makes it possible to determine the measured voltage profiles of the associated root mean square value, the respective peak value or the mean value of the rectified signal, within a predetermined time period. Both the root mean square value, the peak value or the mean value can be used to form the difference between the induced voltages, and thus to determine the movement distance.

It is also advantageous for the digital logic module to be designed at least for magnitude formation, for addition, for subtraction and for division of input signals, or of signals which are derived from the input signals. A logic module such as this makes it possible to form the difference between the absolute magnitudes of the induced voltages, and allows normalization of the difference with respect to the sum of the root mean square values, using the following formula:

$$Q = \frac{V_1 - V_2}{V_{1,rms} + V_{2,rms}}$$

where Q is the normalized movement distance, $V_1$ and $V_2$ respectively denote the absolute magnitude of the induced voltages, and $V_{1,rms}$ and $V_{2,rms}$ respectively denote the root mean square values of the two induced voltages.

In this case, all of the logic operations for determination of the movement distance are carried out in the logic module. It is, of course, also possible to carry out only some of the required logic operations in the logic module, and to carry out the other required operations in a different manner, for example in a downstream component.

In a further advantageous refinement of the invention, the digital logic module is designed to provide offset correction for the input signals which are received alternately from the multiplexer. In this case, the logic module determines any offset by integration of a known voltage profile over a predetermined time period and subtracts this from the digitized profiles of the induced voltages in order to determine the movement distance. As already mentioned, this improves the measurement accuracy. Since the offset is taken directly from the measured signal, the offset correction is carried out during operation of the measurement configuration. In the case of sampling, the integration for determination of the offset corresponds to formation of the sum of the sample values. The digital logic module is advantageously an FPGA.

In a further advantageous refinement of the invention, the circuit configuration comprises a monitoring unit, which is connected to the digital logic module, to the multiplexer and to a voltage generator, with the primary coil being connected to the voltage generator, and with the monitoring unit being designed to produce an excitation voltage (which is correlated in time with the clock cycle of the logic module) for the voltage generator and to switch the multiplexer, correlated with the clock cycle of the logic module.

One period must be sampled as exactly as possible for each determination of the root mean square value and in particular for determination of the mean value of the absolute magnitude of the induced voltages. For this reason, it is advantageous to derive the excitation voltage for the primary coil from the clock cycle of the logic module. If the multiplexer is switched such that it is correlated in time with the clock cycle of the multiplexer, then it is easily possible to detect one or more periods of the respectively induced voltages for the logic operations of the logic module. This further improves the measurement accuracy.

Once more in sum, the two VDT (variable differential transformer) input voltages that are induced in the secondary coils from the alternating voltage in the primary coil are sequentially scanned multiple times over a period of the a.c. voltage. The digital logic module (CPU) then forms from the two induced voltages a mean value, i.e., a rectified average voltage. The synchronization is effected by a generator (for driving the VDT) that is clocked by the CPU. The position is then calculated by forming the quotient of the difference of the voltages and the sum of the voltages.

Other features which are considered as characteristic for the invention are set forth in the appended claims.

Although the invention is illustrated and described herein as embodied in a measurement configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
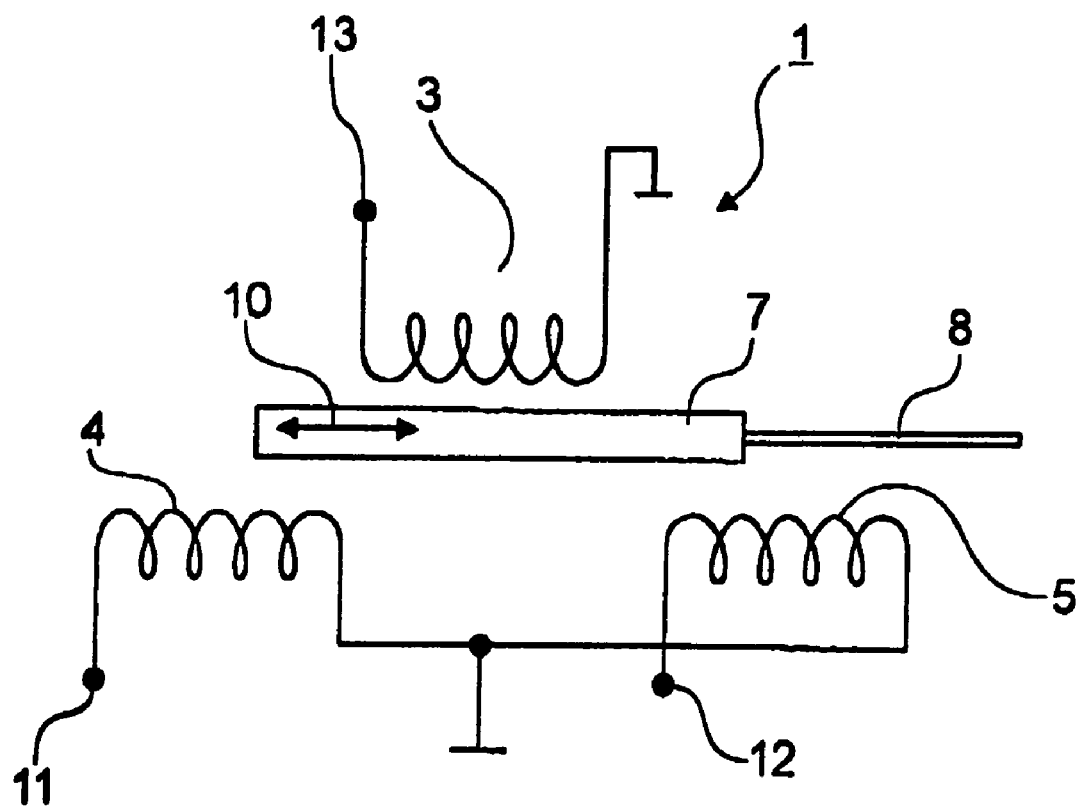
FIG. 1 is a schematic of the design of a movement distance sensor operating on the principle of a differential transformer.

Referring now to the figures of the drawing in detail and first, particularly, to FIG. 1 thereof, the movement distance sensor 1 which operates on the principle of a differential transformer. The sensor may also be referred to as a displacement transducer or a variable displacement transducer. In this case, the movement distance sensor 1 comprises a primary coil 3 and two secondary coils 4 and 5. The primary coil 3 as well as the secondary coils 4 and 5 are wound with appropriate offsets on a cylindrical body which has a central hole. An actuating element 7 with a core composed of a ferromagnetic material can move freely in the interior of the central hole. Any linear movement of an object to be measured is transmitted by means of a connecting element 8 to the actuating element 7, in a corresponding manner to the arrows 10 that are shown.

Any movement of the actuating element 7 corresponding to the arrows 10 changes the magnitude of the magnetic flux between the primary coil 3 and the secondary coils 4 and 5. If, for example, the actuating element 7 moves in the direction of the secondary coil 5, starting from the illustrated rest position, then the magnetic flux which is responsible for the magnetic coupling between the primary coil 3 and the secondary coil 5 is increased. A sinusoidal alternating voltage is used as the excitation voltage for the primary coil 3 for this purpose.

In a movement distance sensor 1, the sum of the root mean square values of the voltages which are induced in the secondary coils 4 and 5 is constant irrespective of the position of the actuating element 7. The position of the actuating element 7, starting from its rest position, can be deduced from the difference between the absolute values of the induced voltages. The difference is in this case generally normalized with respect to the sum of the root mean square values, so that the position of the actuating element 7 is calculated as follows:

$$Q = \frac{V_1 - V_2}{V_{1,rms} + V_{2,rms}}$$

where Q is the normalized movement distance, $V_1$ and $V_2$ respectively denote the absolute magnitude of the induced voltages, and $V_{1,rms}$ and $V_{2,rms}$ respectively denote the root mean square values of the two induced voltages.

The secondary coils 4 and 5 have respective outputs 11 and 12 in order to read the voltages induced in them, with the respective other end of the secondary coils 4 and 5 being at ground potential. For excitation purposes, the primary coil 3 has an input 13, with the primary coil 3 also being connected with respect to ground potential.

Figure 2:
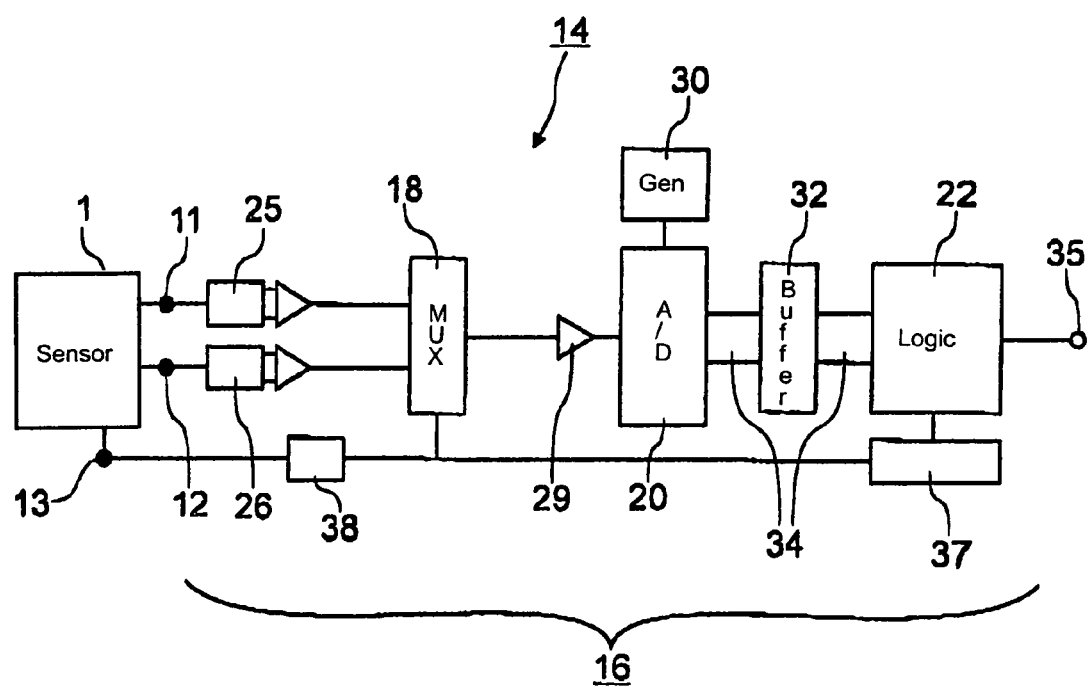
FIG. 2 is a block diagram illustrating a measurement configuration with a movement distance sensor as shown in FIG. 1.

FIG. 2 shows a schematic illustration of a measurement configuration 14 which comprises a movement distance sensor 1, which operates on the principle of a differential transformer, as well as a circuit configuration 16 associated with it. For this purpose, the circuit configuration 16 is connected to the outputs 11 and 12 (which are shown in FIG. 1) of the movement distance sensor 1, at which outputs the two voltages induced in the secondary coils are produced. For excitation of the primary coil, the movement distance sensor 1 is also connected to the circuit configuration 16 via the input 13, as can likewise be seen in FIG. 1.

The circuit configuration 16 comprises a multiplexer 18, an A/D converter 20 and a digital logic module 22, which is in the form of an FPGA. The voltages induced in the two secondary coils of the movement distance sensor 1 are connected by means of the outputs 11 and 12 to the multiplexer 18, via a first input stage 25 and a second input stage 26. Downstream from the multiplexer 18 in the circuit configuration 16, both induced voltages are passed to a single measurement channel. For this purpose, the output of the multiplexer 18 is connected, in terms of circuitry, via a signal amplifier 29 to the input of the A/D converter 20. The A/D converter alternately digitizes the voltages, which are passed to it from the multiplexer 18, from the first and the second secondary coil of the movement distance sensor 1. The digitized voltage profiles are passed to the digital logic module 22 via a 16-bit data line 34 from the output of the A/D converter 20 and via a buffer 32. The buffer 32 is used for temporary storage of the digitized voltage profiles. The signal which is generated by the logic module 22 can be tapped off via the signal output 35 in order to determine the movement distance.

Furthermore, the A/D converter 20 has an associated comparison voltage generator 30 in order to provide a comparison voltage. In addition, a monitoring unit 37 is provided, is connected to the digital logic module 22, controls the multiplexer 18 via appropriate connections corresponding to the clock cycle of the logic module 22, and supplies an excitation voltage to the primary coil of the movement distance sensor 1 via the connection 13. The excitation voltage is produced by a voltage generator 38 for this purpose. In the present case, the multiplexer 18 is switched using the clock cycle of the logic module 22, and the primary coil of the movement distance sensor 1 is also supplied with an alternating voltage based on the clock cycle of the logic module 22.

Figure 3:
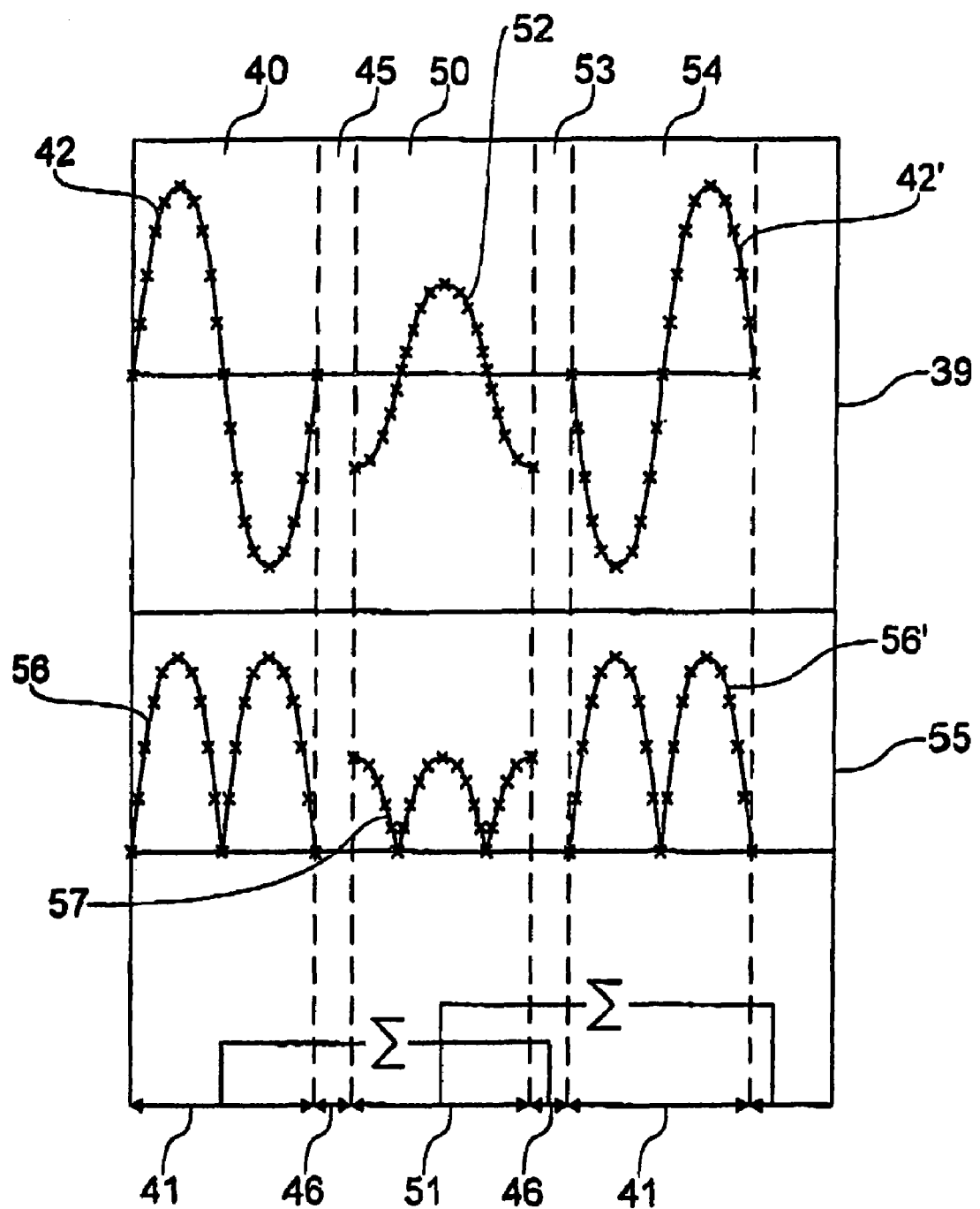
FIG. 3 is a graph of the waveforms for movement distance determination by way of the measurement configuration shown in FIG. 2.

The use of the measurement configuration shown in FIG. 2 to determine a movement distance is explained in more detail by FIG. 3. For this purpose, FIG. 3 uses a graph to show the waveforms of various voltages measured or derived in the circuit configuration 16 shown in FIG. 2. In this case, the magnitude of the voltages is plotted on the ordinate, and the time on the abscissa.

The waveform (in each case measured for one period) of the voltages induced in the two secondary coils is shown in the upper block 39 of the graph. In order to determine the movement distance, the waveform of the first secondary voltage 42 induced in the first secondary coil is first of all measured by sampling in the digital logic module exactly for one period, corresponding to the illustrated first time window 40. In order to allow exactly one period to be measured, the primary coil of the movement distance sensor is excited using the clock cycle of the logic module. The first sampling time 41 thus corresponds exactly to the length of one period of the first secondary voltage 42.

In the second time window 45, the multiplexer 18 is switched to the voltage induced in the second secondary coil. In order to take account of any stabilization times in the modules that are used, no further measurement is carried out by the logic module during a stabilization time 46. Once the stabilization time 46 has elapsed, the logic module once again samples the second secondary voltage 52 induced in the second secondary coil, for exactly one period of the waveform. This is illustrated in the third time window 50. In this case, once again, the second sampling time 51 corresponds exactly to one period duration of the second secondary voltage 52. If the waveform of the first secondary voltage in the first time window 40 is compared with the waveform of the second secondary voltage 52 in the third time window 50, this illustrates the phase shift between the first and the second secondary voltages 42 and 52, respectively, resulting from the design of the movement distance sensor 1. However, this is irrelevant to the determination of the movement distance itself.

Once the sampling of the second secondary voltage 52 has been completed and the multiplexer 18 has switched again, the process once again waits for the stabilization time 46 of the component to elapse, in the fourth time window 53.

Once the stabilization time 46 has elapsed—as illustrated in the fifth time window 54—the waveform of the first secondary voltage 42' is measured by sampling at a subsequent time, for exactly one period.

The lower block 55 of the graph shows the formation of the magnitude of the voltage profiles illustrated in the upper block 39. The profile of the magnitude of the first secondary voltage 56 and 56' can thus be seen in the first and fifth time windows 40 and 54, respectively. The profile of the magnitude of the second secondary voltage 57 is shown in the third time window 50.

The difference between the absolute magnitudes of the waveform of the first and second secondary voltages is required in order to calculate the movement distance. In consequence, in the illustrated case, the movement distance can in each case be determined once the two sampling times 41 and 51 and a stabilization time 46 have elapsed. This is indicated by the sum symbols Σ that are shown. It has been found that, in terms of error tolerances, it is best to use the mean value of the sampled absolute values measured for one period in order to form the difference between the absolute magnitudes. This rectifier mean value is formed by summation of the magnitude of the sampled voltage values, after which the sum is divided by the number of sample values.

We claim:

1. A method of measuring a movement distance, the method which comprises:

providing a measurement configuration with a variable differential transformer assembly having a primary coil, first and second secondary coils, and an actuating element movably disposed for influencing a voltage induced into the secondary coils;

connecting the primary coil to an alternating voltage;

measuring a first input voltage at the first secondary coil and a second input voltage at the second secondary coil by scanning the first and second input voltages multiple times during a period of the alternating voltage;

passing the multiple-scanned first and second input voltages to a digital logic module;

determining a rectified average value of the first input voltage and of the second input voltage in the digital logic module;

calculating a relative position of the actuating element from the average values of the first and second input voltages;

connecting a monitoring unit to the digital logic module, to the multiplexer, and to a voltage generator, connecting the primary coil to the voltage generator, and producing with the monitoring unit an excitation voltage for the voltage generator, thereby correlating the excitation voltage in time with a clock cycle of the digital logic module and switching the multiplexer in correlation with the clock cycle of the digital logic module.

2. A measurement configuration, comprising:

a variable differential transformer assembly including a primary coil, a first secondary coil and a second secondary coil, an actuating element movably disposed for influencing a voltage induced in said secondary coils, and a circuit configuration connected to said secondary coils for measuring a displacement of said actuating element;

said circuit configuration including a multiplexer connected to receive and to sequentially output a signal representing the voltages induced in said first and second secondary coils, an A/D converter for outputting a digital signal, and a digital logic module connected to receive and to process the digital signal;

said digital logic module being configured to calculate from the digital signals an amount of displacement of said actuating element;

a voltage generator connected to said primary coil for injecting an alternating voltage into said transformer assembly; and a monitoring unit connected to said digital logic module, to said multiplexer, and to said voltage generator, said monitoring unit producing an excitation voltage for said voltage generator and switching said multiplexer in correlation with a clock cycle of said digital logic module.

3. The measurement configuration according to claim 2, wherein said digital logic module is configured to sample the input signals received alternately from said multiplexer.

4. The measurement configuration according to claim 2, wherein said digital logic module is configured for magnitude formation, for addition, for subtraction and for division of input signals, or of signals derived from the input signals.

5. The measurement configuration according to claim 2, wherein said digital logic module is configured to periodically determine a sum of the root mean square values of the input signals and a difference between the mean values of their absolute values by sampling the input signals received alternately from the multiplexer, and to determine therefrom the amount of displacement by quotient formation.

6. The measurement configuration according to claim 2, wherein said digital logic module is configured to provide offset correction for the input signals received alternately from the multiplexer.

7. The measurement configuration according to claim 2, wherein said digital logic module is an FPGA.

* * * * *